United States Patent Office 3,095,329
Patented June 25, 1963

---

3,095,329
PROCESS FOR THE CONCENTRATION OF SUBSTANCES BY ABSORPTION FROM SOLUTIONS
Johann Giesen, Haldenstein, near Chur, Switzerland, and Fritz Müller, deceased, late of Chur, Switzerland, by Gertrud Müller-Grunwaldt, administratrix, Chur, Switzerland, assignors to Inventa A.G. fuer Forschung und Patentverwertung, Zurich, Switzerland
No Drawing. Filed Mar. 7, 1958, Ser. No. 719,978
7 Claims. (Cl. 127—55)

The present invention pertains to a process which facilitates concentration of substances which can be absorbed from solutions.

The concentration of a solution commonly is accomplished by evaporation of the solvent.

Another means of concentration is extraction. Hereby, the dissolved substance is transferred into another solvent, which, under given conditions of the extraction, is a better solvent for the solute than the original one, and which is either immiscible with the first solvent or else miscible to a limited degree only. Extraction cannot be applied if the first solvent, containing the solute in great dilution, is also the best solvent.

In that case, up to now, the only means of concentration consisted in evaporation of the solvent. However, this process, in many instances, has damaging effects on substances which are sensitive to increased temperatures.

The present process is based on the inventors' discovery that solutions of substances which can be absorbed from solutions may be concentrated by depositing the same onto absorbents which have been impregnated with materials capable of forming complexes, and can be separated with neutral liquids, the amount of which is smaller than that of the solvent used in the absorption.

According to this method, substances like sugars, glycols, phenols, hydrocarbons, and others, may be absorbed from dilute solutions onto such absorbents as ion exchanges, silica gel, alumina, activated carbon, and others, after the latter have been impregnated with substances capable of forming complexes, such as boric acid, borax, ions of copper, tin, aluminum, silver, and others. The absorbed materials then can be removed from the absorbent with the same or with another solvent.

Preferably, the dilute solution is put into a column consisting of the absorbent which, in turn, has been impregnated with the complex-former, e.g. borax. The impregnation is accomplished by using an aqueous solution of the complex-former and washing out its excess. If ion exchangers are used for the purpose, they can be activated in the known manner before impregnation. The dilute solution is put into the column until the liquid flowing off at the bottom is no longer pure solvent but consists of the solution.

It is possible to feed through the column a solvent which is the same as used for the absorption, or else any other neutral liquid which is capable of dissolving the substance to be absorbed. Such neutral liquids can be solutions of neutral salts in water or solutions of substances analogous to the absorbed material. For instance, a glycerol solution can be absorbed onto activated and impregnated absorbents and can be separated by an aqueous sorbitol solution. When the quantity of the solvent used for separation is smaller than that used for absorption, a higher concentrate of the solution will be recovered at the bottom of the column than that applied to the absorbent. It is understood that a yield of 100 percent cannot be obtained in every case; however, in most instances, that is not required because the absorbent can be re-used, usually without regeneration or re-impregnation. If a re-impregnation with complex-formers is needed, the substances not yet separated do not interfere with that process.

In the following, the process according to the invention is more fully described in a number of examples. However, it should be understood that these examples are given by way of illustration and not of limitation and that many changes in the details can be made without departing from the spirit of the invention.

Parts given are by weight.

*Example 1*

A solution of 6 parts of glucose in 600 parts of water is put into a column containing 100 parts ion exchanger Amberlite IRA 400 (registered trademark: Anion exchanger with aromatic matrix and active groups of basic ammonium compounds). This ion exchanger previously had been activated with a concentrated borax solution and washed until the wash water was free from borax. After passing through the column, the solution is practically free from glucose. The glucose is extracted from the ion exchanger with 40 parts of a 2 percent sodium sulfate solution. The yield is a solution containing 13 percent glucose.

*Example 2*

A solution of 5 parts of fructose in 1,000 parts of water is put through a column containing 100 parts ion exchanger Amberlite IRA 400 (registered trademark, cf. Example 1). The ion exchanger previously had been activated with concentrated borax solution, as in Example 1. The solution is practically free from fructose after having passed through the column. The fructose is washed from the ion exchanger with 40 parts of a 2 percent sodium chloride solution, and the solution thus obtained contains 11 percent fructose.

*Example 3*

360 parts of a 5 percent sorbitol solution are put through a column containing 100 parts of anion exchanger Permutit ESB (registered trademark). The ion exchanger previously had been activated with concentrated borax solution, as in Example 1. After passing the column, the solution is practically free from sorbitol. After extraction with 50 parts of a 15 percent sodium sulfate solution, a sorbitol solution of 35 percent is obtained.

*Example 4*

800 parts of a 3 percent glycerol solution are put through a column containing 100 parts of ion exchanger Amberlite IRA 400 (cf. Example 1). The solution leaves the column practically free from glycerol. By extraction with 100 parts of a 10 percent ammonium sulfate solution, the solution thus obtained contains 21 percent glycerol.

*Example 5*

1,000 parts of a 1.3 percent 1,2-propyleneglycol solution are put through a column containing 100 parts ion exchanger Permutit EFB (registered trademark). The ion exchanger previously had been treated with concentrated borax solution as in Example 1. The solution, after passing through the column, is practically free from 1,2-propyleneglycol. For the extraction, 50 parts (by weight) of a 36 percent sorbitol solution are used. The solution thus obtained contains approximately 29 percent 1,2-propyleneglycol and is practically free from sorbitol.

What we claim is:

1. A process for the concentration of substances from solutions by solvent absorption, which comprises depositing the substances onto absorbents selected from the group consisting of ion exchangers, activated carbon, silica gel and alumina, which are impregnated with complex-formers selected from the group consisting of borax, boric acid and ions of copper, tin, aluminum and silver, and incompletely extracting the substances with solutions of neutral liquids selected from the group of aqueous neutral salts and of materials analogous to the absorbed substances, the quantity of said neutral liquids being less than that of the solvent used in the absorption, allowing part of the substance to remain on the absorbent.

2. The process according to claim 1, wherein sugar solutions are concentrated by means of absorbents.

3. The process according to claim 1, wherein glycols are concentrated by means of absorbents.

4. The process according to claim 1, wherein phenols are concentrated by means of absorbents.

5. The process according to claim 1, wherein aliphatic hydrocarbons are concentrated by means of absorbents.

6. The process according to claim 1, wherein ammonium sulfate solutions are used as neutral liquids.

7. The process according to claim 1, wherein sodium sulfate solutions are used.

References Cited in the file of this patent

UNITED STATES PATENTS

| | | |
|---|---|---|
| 178,315 | Lugo | June 6, 1876 |
| 2,504,169 | Wolfrom et al. | Apr. 18, 1950 |
| 2,524,114 | Wolfrom et al. | Oct. 3, 1950 |
| 2,818,851 | Khym et al. | Jan. 7, 1958 |

OTHER REFERENCES

Archives of Biochemistry and Biophysics, article by Noggle and L. P. Zill, November 1952, pp. 21–28.

Journal of Chem. Society, article by Barker et al., December 1955, pp. 4276–4280.